(12) United States Patent
Argue et al.

(10) Patent No.: US 9,712,714 B2
(45) Date of Patent: Jul. 18, 2017

(54) DIGITAL WATERMARK FEATURE FOR DEVICE TO DEVICE DUPLICATION OF A DIGITAL RECEIPT

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 363 days.

(21) Appl. No.: 14/266,542

(22) Filed: Apr. 30, 2014

(65) Prior Publication Data

US 2015/0319333 A1     Nov. 5, 2015

(51) Int. Cl.
| | |
|---|---|
| *G06K 9/00* | (2006.01) |
| *H04N 1/32* | (2006.01) |
| *H04W 4/00* | (2009.01) |
| *G06T 1/00* | (2006.01) |
| *G06K 7/14* | (2006.01) |
| *G06Q 30/04* | (2012.01) |

(52) U.S. Cl.
CPC ............ *H04N 1/32* (2013.01); *G06K 7/1413* (2013.01); *G06Q 30/04* (2013.01); *G06T 1/005* (2013.01); *H04N 1/3232* (2013.01); *H04N 1/32144* (2013.01); *H04W 4/008* (2013.01); *G06T 2201/0062* (2013.01); *G06T 2201/0081* (2013.01); *H04N 2201/3233* (2013.01); *H04N 2201/3269* (2013.01)

(58) Field of Classification Search
None
See application file for complete search history.

(56) References Cited

U.S. PATENT DOCUMENTS

| | | |
|---|---|---|
| 4,947,028 A | 8/1990 | Gorog |
| 6,590,996 B1 | 7/2003 | Reed |
| 6,625,297 B1 | 9/2003 | Bradley |
| 6,850,626 B2 | 2/2005 | Rhoads |
| 6,993,153 B2 | 1/2006 | Bradley |
| 7,027,614 B2 | 4/2006 | Reed |
| 7,044,395 B1 | 5/2006 | Davis |
| 7,111,168 B2 | 9/2006 | Lofgren |
| 7,111,170 B2 | 9/2006 | Hein |
| 7,330,997 B1 * | 2/2008 | Odom ............... G06F 11/1464 711/162 |
| 7,436,976 B2 | 10/2008 | Levy |
| 7,501,646 B2 | 3/2009 | Ross |
| 7,773,770 B2 | 8/2010 | Evans |
| 8,103,542 B1 | 1/2012 | Davis |
| 8,379,908 B2 | 2/2013 | Davis |
| 8,521,850 B2 | 8/2013 | Rhoads |

(Continued)

*Primary Examiner* — Sean Conner
(74) *Attorney, Agent, or Firm* — Bryan Cave LLP

(57) ABSTRACT

A computer-implemented process can be operated to create a watermarked copy of a unique original copy of an electronic sales receipt in a first computerized device to a second computerized device. The watermarked copy includes an electronic watermark identifying the copy. The process includes creating the watermarked copy of the electronic sales receipt by copying information from the original copy of the electronic sales receipt to the watermarked copy and providing the electronic watermark within the watermarked copy.

18 Claims, 7 Drawing Sheets

(56) References Cited

U.S. PATENT DOCUMENTS

| | | | |
|---|---|---|---|
| 8,677,126 B2 | 3/2014 | Meehan | |
| 2004/0083134 A1* | 4/2004 | Spero | G06Q 20/20 |
| | | | 705/16 |
| 2009/0116686 A1* | 5/2009 | Samtani | G06F 21/10 |
| | | | 382/100 |
| 2010/0153273 A1* | 6/2010 | Sellars | G06Q 20/02 |
| | | | 705/67 |
| 2013/0276148 A1 | 10/2013 | Killian | |
| 2014/0308934 A1* | 10/2014 | Fisher | G06Q 20/20 |
| | | | 455/414.1 |
| 2015/0206111 A1* | 7/2015 | Sugiyama | G06Q 20/12 |
| | | | 705/14.66 |

* cited by examiner

DIGITAL WATERMARK FEATURE FOR DEVICE TO DEVICE DUPLICATION OF A DIGITAL RECEIPT

BACKGROUND INFORMATION

1. Field of the Disclosure

The present disclosure relates generally to a computer implemented process to allow customers to use two computerized device to create and manage copies of electronic receipts. In particular, examples of the present disclosure are related to maintaining and permitting transfer of a single, unique original receipt and permitting an electronic copy of the original.

2. Background

Portable computerized devices permit a user to collect and process data from surroundings. A portable computerized device can include a camera device configured to capture an image or a series of images which can collectively be defined as a video feed. Programming upon or accessible by the device can process the image or images to identify useful information. The device can include wireless communication to acquire or send information to a personal computerized device or other device.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
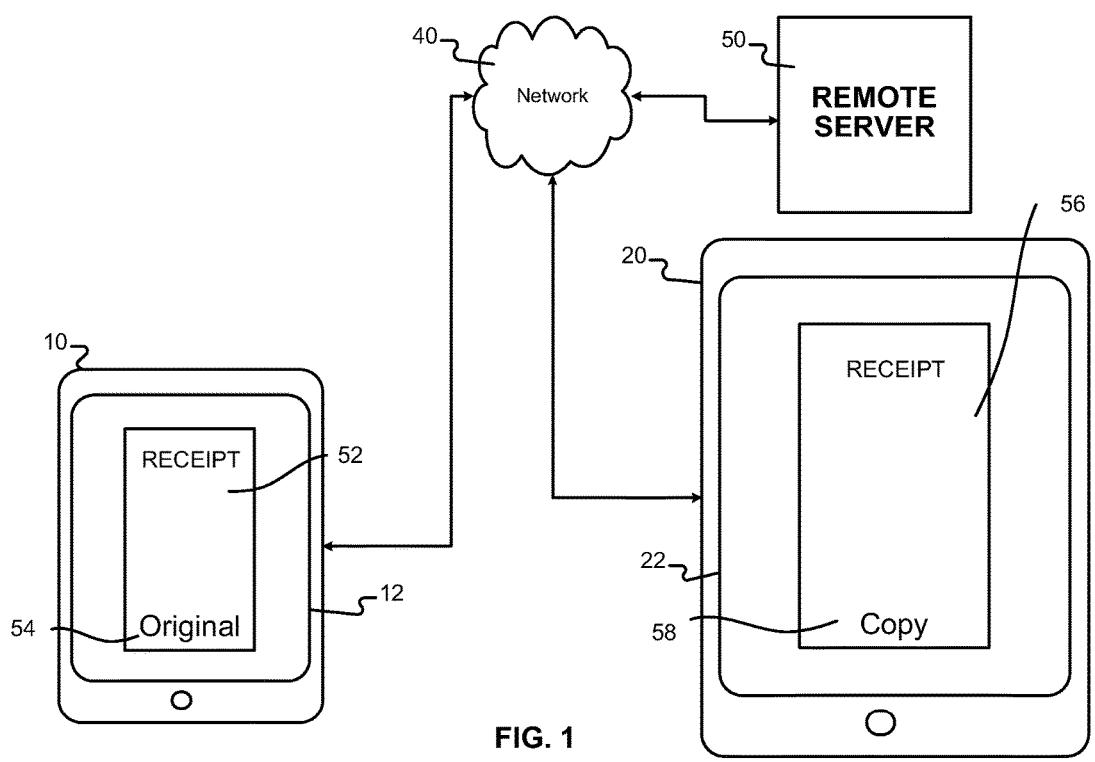
FIG. 1 is a schematic drawing illustrating an exemplary portable computerized device in communication with another portable computerized device, according to some embodiments of the disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or processes have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Customers receive receipts for purchase transactions that occur at a store. The receipt proves ownership of the items being removed from the store. Most stores honor a return policy, wherein a customer providing a valid, original receipt can return an item to the store for a refund. Store usually require the original receipt for a full refund to prevent fraud. Without requiring a receipt, an individual could buy products at a discount in one store and fraudulently return the products at another store to receive the full price return value of the products.

Paper ticket receipts frequently include measures to prevent easy copying of the receipt and passing off the copy as an original. Inks of various colors and complex patterns that are intended to prevent a copy from looking like an original are included in many receipts.

Electronic sales receipts can be used for the convenience of shoppers. Paper ticket receipts are easy to misplace. An electronic sales receipt can be emailed or otherwise transferred to a customer, and the customer has a convenient original receipt that can be easily produced as needed.

An electronic sales receipts existing as a simple digital image can be copied. Such receipts can permit an individual to make seven copies of one original receipt and return eight products where only one was legitimately purchased at the store. A process is disclosed to maintain and permit transfer of an original receipt between devices, while also permitting creation of copies of the original receipt, wherein the copies include an electronic watermark indicating that the copies are not the unique original receipt.

An individual wishing to share receipts with another individual can utilize a computerized device to transmit the receipt. In one exemplary embodiment, a shopper can use a portable computerized device, such as a smart phone or a tablet computer configured with a close range wireless communication technology such as Bluetooth or Near Field Communication (NFC) to transmit the data to another device. In another embodiment, a first computerized device can utilize a communications network to transmit data to another device. In another embodiment, a remote server can maintain control over receipt copies located on customer operated devices, wherein the receipts can only be used if certified by the remote server.

Original electronic receipts can be created in one of a number of file formats known in the art that prevent copying of the original file without an authorized program or application to create copies of the original. An original copy of the file can be downloaded, for example, in a one-time executable file format which creates the original copy of the electronic sales receipt. In using such a file format, a program or application created to make copies of the original can require that an electronic watermark be placed upon all copies of the original. The original electronic sales receipt can stay on the same device, and the customer can use the copying program to create watermarked copies as desired.

In another embodiment, a receipt management application located on computerized devices operated by customers can be employed to permit transfer of an original electronic sales receipt from one device to another while preventing duplicate copies of the original receipt from being created. In one exemplary embodiment, in combination with a file format that prevents copying without the use of an authorized program, a program or application to copy the original can securely store a copy of the original application, remove the original copy from the original location, provide a copy of the stored original upon a second device, provide a watermarked copy to the original location, and delete the stored copy. The same receipt management application can create multiple watermarked copies of the original receipt upon demand. In an optional configuration, the receipt management application on each device can act as a gatekeeper, for example, requiring communication with an originating receipt management application or action from the installing executable file to certify an original electronic sales receipt before the receipt management application will permit access to the copy on that device. In such a configuration, simply having a copy of the original receipt on the device would not be enough to permit access to the receipt without the receipt having been certified as part of the installation or copying process.

In another exemplary embodiment, the store can retain control over copying and/or certification of original copies of receipts. Any program or application used to copy a sales receipt would need to establish communication with a remote server operated by the store. The remote server can require authentication information of the customer wishing to transfer the original copy of the receipt. The remote server can approve or disapprove of the copy, for example, with the copy to the new device only being permitted when the original copy is shown to be removed from the original device. According to another embodiment, the remote server can coordinate authorized devices and a customer's registered account. The remote server can keep records that the receipt for order A is only authorized on the device A registered to the customer, and the receipt for order B is only authorized on device B registered to the customer. A transfer of the authorized receipt for order A to device B requires permission and changing of information within the remote server. In this embodiment, all receipts would be considered watermarked as copies unless the device and receipt registration at the remote server certified a copy as original, and then the watermark would be suppressed.

An electronic watermark can be an affirmative presence of particular code or algorithms within a copy version of an electronic sales receipt, wherein the presence of the particular code identifies the copy as a copy and not the original. In another embodiment, an electronic watermark can be assumed to be present in all sales receipts, wherein every copy is assumed to be a non-original copy, and code can be included in an original receipt to affirmatively suppress the watermark.

Two portable computerized devices in close proximity can directly communicate and transfer an original receipt or create a copy receipt as disclosed herein. Such a direct transfer can use an exemplary Bluetooth® connection to transfer data between the devices.

Hardware and software configurations of the systems disclosed herein can take many different embodiments. In one embodiment, a single receipt index server can be utilized remotely to provide indirect communication between portable computerized devices, with communication of necessary information being transferred over a communications network. Communication between portable computerized devices and a receipt index server can be over a cellular network, over a local network operated by the store, or by other communications processes known in the art.

To illustrate, FIG. 1 is a schematic drawing illustrating an exemplary portable computerized device in direct communication with another portable computerized device. Portable computerized device 10 is illustrated, in communication with wireless network 40. Device 10 is an exemplary portable computerized device embodied as a smart-phone including input devices configured to gather information and a processor configured to make determinations regarding data from the input devices. A second portable computerized device 20 is illustrated embodied as a tablet computer and including a remote computerized system with modules operating to communicate information with device 10 over wireless network 40. Network 40 can be wireless or can include wired connections. Remote server 50 is illustrated and can be utilized to execute a transfer or copy of a receipt according to processes disclosed herein.

Portable computerized device 10 and 20 can include a number of exemplary devices, including a smart phone, a tablet computer, processor-equipped glasses configured to project graphics upon a view the wearer, or any other similar device known in the art.

Device 10 is illustrated including graphical user interface (GUI) 12, whereupon an original copy 52 of a receipt is displayed, including a designation 54 showing the copy to be an original copy. A copy of the original copy of the receipt can be created upon device 20 according to processes disclosed herein. Device 20 is illustrated including GUI 22, whereupon a copy 56 is displayed, including a watermark designation 58 showing that copy 56 is not an original copy of the receipt.

Figure 2:
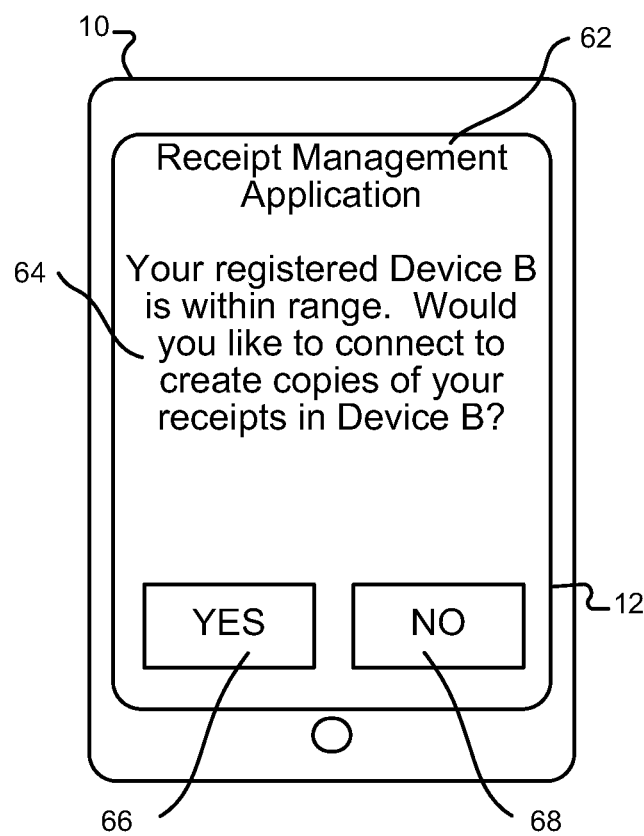
FIG. 2 illustrates an exemplary portable computerized device identifying that another portable computerized device is within range available for communication, prompting the user to establish a connection with said device, according to some embodiments of the disclosure.

FIG. 2 is an exemplary view of a portable computerized device identifying that another portable computerized device is within range available for communication, prompting the user to establish a connection with said device. Device 10 is illustrated including GUI 12, whereupon a banner 62 describing the application is displayed. A message 64 is provided upon GUI 12 prompting the user, stating that another device registered to the user, Device B, is within wireless communication range. The user is prompted through buttons 66 and 68 to either confirm or reject, respectively, creation of copy receipts in Device B.

Figure 3:
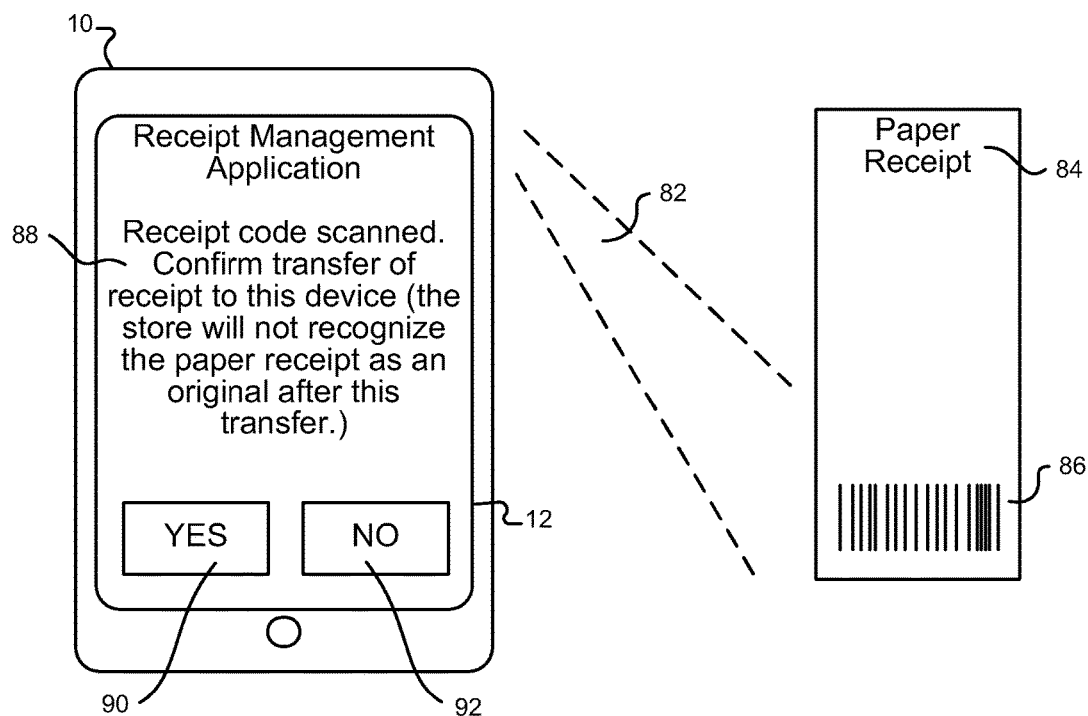
FIG. 3 illustrates an exemplary portable computerized device creating an original electronic sales receipt from an original paper copy of the receipt, according to some embodiments of the disclosure.

FIG. 3 illustrates an exemplary portable computerized device transferring an original receipt from a paper ticket copy to an original electronic sales receipt stored upon the device. Device 10 is illustrated include GUI 12. Device 10 includes a camera device with a camera view 82. Paper receipt 84 is illustrated including a barcode 86 providing a unique identifier to receipt 84. Device 10 can capture an image of barcode 86 and use image recognition software to identify receipt 84. In one embodiment, device 10 can establish a connection with a remote server operated by the store, the store can provide an original electronic sales receipt to the device, and the store can store in a memory device that the paper copy of receipt 84 is no longer to be treated as an original copy of the receipt. In another embodiment, a receipt management application on the device 10 can take an image of the paper receipt, access details about the receipt, and create an original copy of the receipt upon device 10 only after a subsequent picture is taken of receipt 84 with a dark line drawn through barcode 86. A store practice or software operated by customer service employees can establish that a receipt 84 with a line through the barcode 86 is not to be treated as an original receipt. Message 88 on GUI 12 informs that user that the receipt code has been scanned and asks the user through buttons 90 and 92 to confirm that he or she wishes the original copy of the receipt to be transferred from the paper copy to the electronic copy. A number of embodiments for transferring an original copy from a paper copy to an electronic copy are envisioned, and the disclosure is not intended to be limited to the particular exemplary embodiments provided herein.

Figure 4:
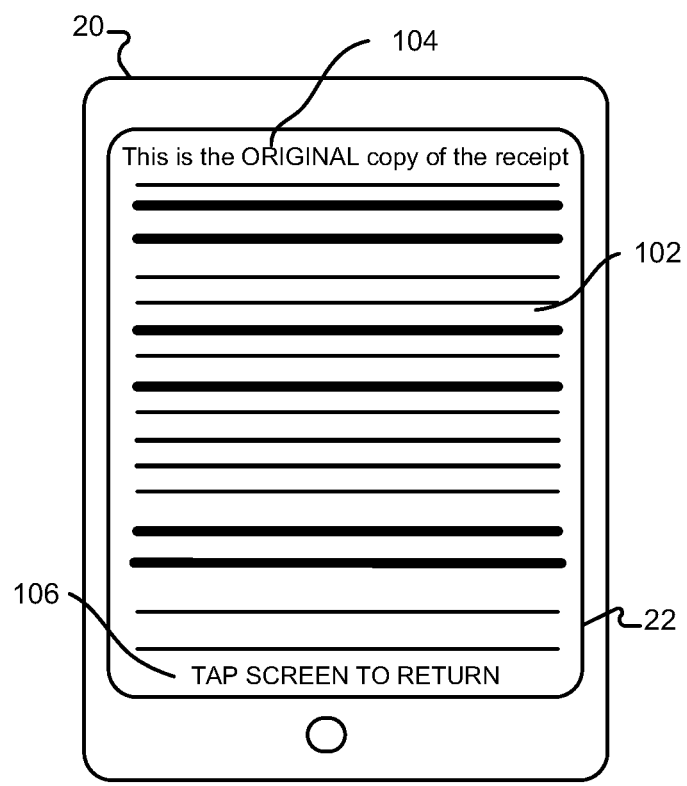
FIG. 4 illustrates an exemplary portable computerized device displaying a barcode associated with an original electronic sales receipt, according to some embodiments of the disclosure.

FIG. 4 illustrates an exemplary portable computerized device providing a barcode for a receipt for scanning by a customer service employee along with a designation that the receipt is an original copy of the receipt. Device 20 is illustrated including GUI 22, whereupon a barcode 102 is illustrated. The barcode 102 includes a unique identifier for a receipt generated related to a purchase made by a customer. According to processes disclosed herein, the receipt associated with barcode 102 can be established as an original receipt. A receipt management application operating on device 20 can certify that the receipt contained upon the device is an original copy, and message 104 can be provided confirming that the barcode 102 represents an original copy of the receipt. Message 106 is provided enabling the customer to exit the barcode display screen. A similar display could be generated on a device including a watermarked copy of the original receipt, with the exception that message 104 would identify the barcode as being associated with a WATERMARK COPY of the original. In another embodiment, a barcode could only be provided for the original copy of the receipt. In one embodiment, a watermarked copy can be assigned a unique barcode different from the original copy to ensure that the watermarked copy is not confused with the original.

Figure 5:
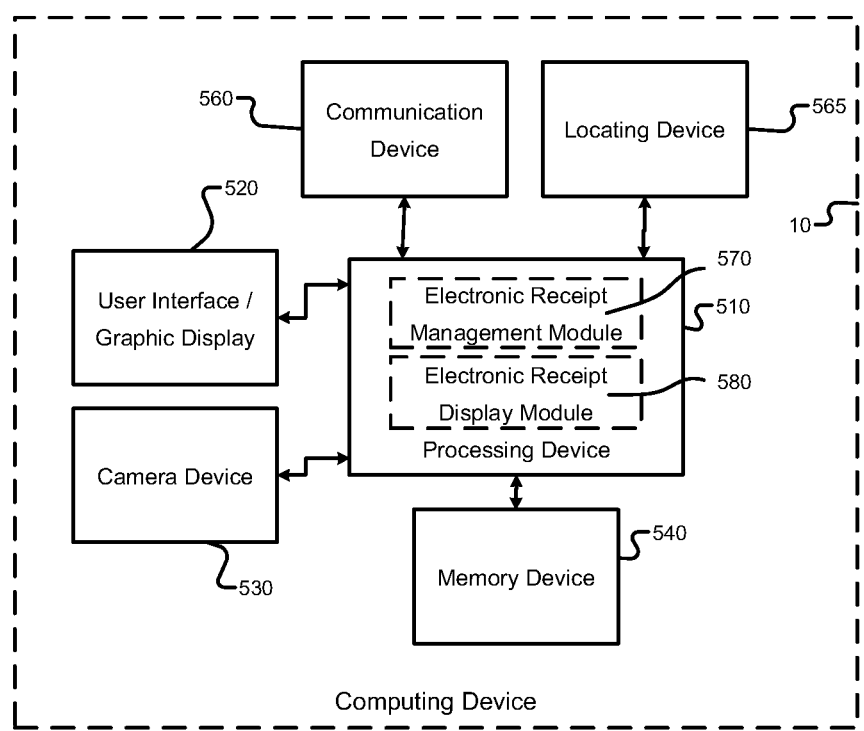
FIG. 5 is a schematic illustrating an exemplary portable computerized device configured to implement processes disclosed herein, according to some embodiments of the disclosure.

FIG. 5 is a schematic illustrating an exemplary portable computerized device configured to implement processes disclosed herein, according to some embodiment of the discloser. Device 10 includes a processing device 510, a user interface 520, a communication device 560, a locating device 565, a camera 530, and a memory device 540.

The processing device 510 can include memory, e.g., read only memory (ROM) and random access memory (RAM), storing processor-executable memory (ROM) and random access memory (RAM), storing processor-executable instructions and one or more processors that execute the processor-executable instructions. In embodiments where the processing device 510 includes two or more processors, the processors can operate in a parallel or distributed manner. In the illustrative embodiment, the processing device 510 can execute the operating system of the portable computerized device. In the illustrative embodiment, the processing device 510 also executes an electronic receipt display module 580 and an electronic receipt management module 570, which are described in greater detail below.

The user interface 520 is a device that allows a user to interact with the portable computerized device. While one user interface 520 is shown, the term "user interface" can include, but is not limited to, a touch screen, a physical keyboard, a mouse, a microphone, and/or a speaker. The communication device 560 is a device that allows the portable computerized device to communicate with another device, e.g., another portable computerized device. The communication device 560 can include one or more wireless transceivers for performing wireless communication and/or one or more communication ports for performing wired communication. The memory device 540 is a device that stores data generated or received by the portable computerized device. The memory device 540 can include, but is not limited to, a hard disc drive, an optical disc drive, and/or a flash memory drive.

The camera 530 is a digital camera that captures a digital photograph or a video clip embodied as a series of images. The camera 530 receives an instruction to capture an image and captures an image of a view proximate to the camera. The digital photograph or images captured by the camber can be a bitmap file. The bitmap file can be a bitmap, a JPEG, a GIF, or any other suitably formatted file. The camera 530 can receive the instruction to capture the image from the processing device 510 and can output the digital photograph to the processing device 510.

Locating device 565 includes sensors and programming configured to locate the device. In one embodiment, locating device 565 can use a plurality of signals from local cell phone towers to accurately triangulate a position of the device. The cell phone signals can further be used to determine an orientation of the phone, for example, enabling the determination that the user is indicating a desired connection event to the device, as disclosed herein. Locating device 565 can further include an accelerometer or accelerometers to further enable determination of a position, orientation, or relative motion of the device. In another embodiment, locating device 565 could be a GPS device, which determines the location of the portable computerized device by communicating with a plurality of GPS satellites. The locating device 565 can perform known triangulation processes to determine the GPS coordinates of the portable computerized device.

Electronic receipt display module 580 is configured to provide a graphic display upon a portable computerized device representing a receipt for review by a user or for use by a customer service employee at a store. Module 580 can monitor a barcode number associated with a receipt, can monitor a status of the receipt, for example, as provided by module 570 or by a remote server, and can provide a graphic representation of the receipt.

Electronic receipt management module 570 can include programming transfer or create receipts as disclosed herein. Module 570 can include programming to access or communicate with remote server operated by a store. Module 570 can include programming to certify a receipt as an original copy, to create a watermark indicating that a receipt is a copy, and to recognize a watermark on a receipt and indicate that the receipt is a copy. Functions related to receipts as disclosed herein can be operated upon portable computerized device 10, a remote server, or a combination thereof, and the exemplary embodiments of the modules executing programming herein are provided as non-limiting examples.

Embodiments in accordance with the present disclosure may be embodied as a device, process, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Figure 6:
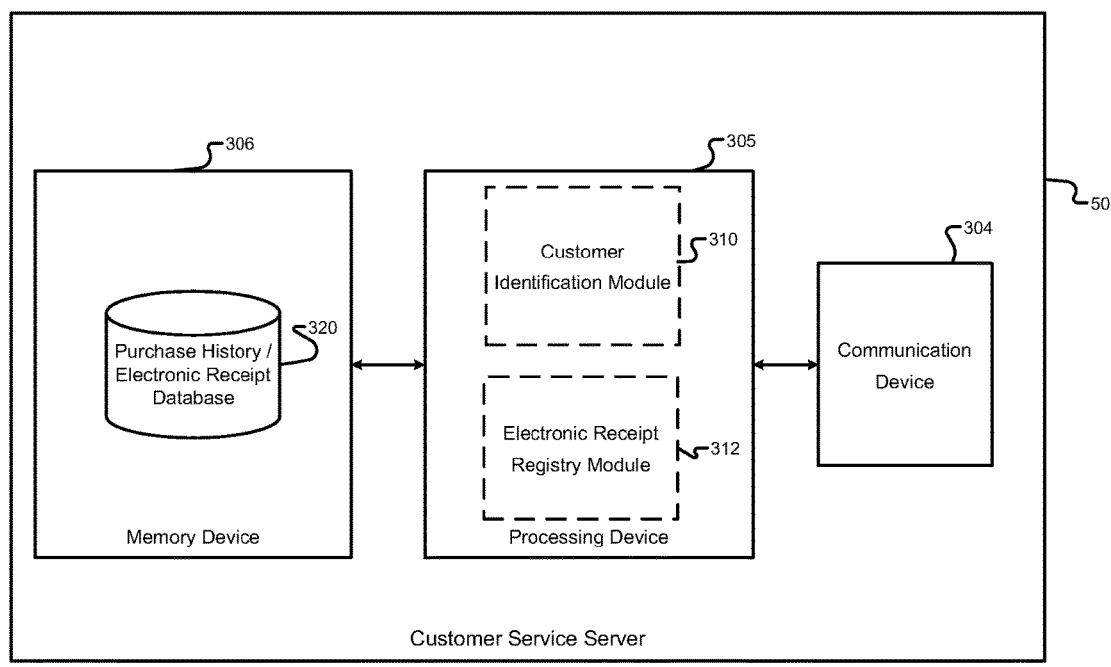
FIG. 6 illustrates an exemplary customer service server, according to some embodiments of the disclosure.

Referring now to FIG. 6, a diagram illustrating an exemplary remote server 50 is depicted. In an exemplary embodiment, the remote server 50 embodied as a customer service server includes a processing device 305, a communication device 304, and memory device 306.

The processing device 305 can include memory, e.g., read only memory (ROM) and random access memory (RAM), storing processor-executable instructions and one or more processors that execute the processor-executable instructions. In embodiments where the processing device 305 includes two or more processors, the processors can operate in a parallel or distributed manner. In the illustrative embodiment, the processing device 305 executes an electronic receipt registry module 312 and a customer identification module 310, which are described in greater detail below.

The communication device 304 is a device that allows the remote server 50 to communicate with another device, e.g., a portable computerized device, via the network 30. The communication device 304 can include one or more wireless transceivers for performing wireless communication and/or one or more communication ports for performing wired communication.

The memory device 306 is a device that stores data generated or received by the remote server 50. The memory device 306 can include, but is not limited to a hard disc drive, an optical disc drive, and/or a flash memory drive. The memory device 306 is accessible to the processing device 305. A purchase history/electronic receipt database 320 can be stored in the memory device 306. Database 320 can include information related to a plurality of customer accounts, and a plurality of sales receipts can be stored related to each customer account. Details regarding the customer accounts such as login/identity authentication information can be stored in database 320 or can be stored in a separate customer accounts database.

The customer identification module 310 can query and receive information from a customer's portable computerized device to authenticate the identity of the customer using the device. Data received from the customer can be compared with information from memory device 306, and module 310 can either confirm or deny authentication of the identity of the customer based upon the comparing.

The electronic receipt registry module 312 receives customer account information from customer identification module 310. Based upon the customer account information, module 312 can access a plurality of receipts associated with the account, provide details about the receipts to the device of the customer, process inquiries by the customer about particular receipts, search through receipts for a desired item, and designate a particular electronic sales receipt as selected based upon input from the customer. In one embodiment, module 312 can include programming to certify a receipt as an original receipt or as a copy of an original receipt, and module 312 can include an ability to transfer an original copy of a receipt to a computerized device.

It is appreciated that the foregoing example of the remote server 50 is not intended to be limiting. Variations of the exemplary remote server 50 are contemplated and within the scope of the disclosure.

Figure 7:
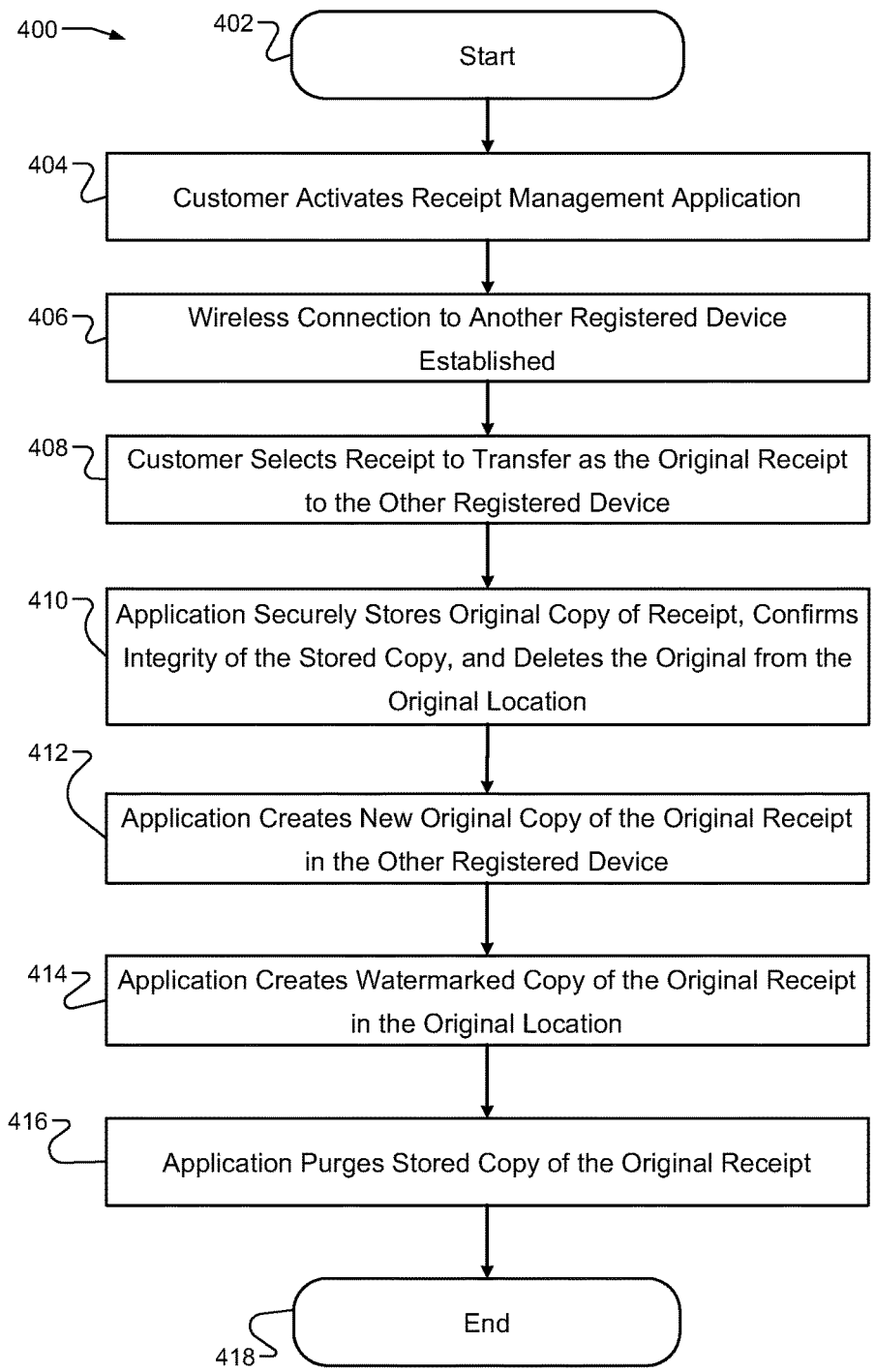
FIG. 7 illustrates in a flowchart an exemplary process, according to some embodiments of the disclosure.

FIG. 7 is a flowchart illustrating an exemplary process to establish a short range wireless connection between portable computerized devices and transfer information between them, according to some embodiment of the disclosure. Process 400 begins at step 402. At step 404, the customer activates a receipt management application on a first computerized device. At step 406, a wireless connection to a second device registered to the user is established. At step 408, customer identifies a receipt that is an original copy upon the first device that the customer would like to transfer as the original copy to the second device. At step 410, the application securely stores an original copy of the receipt, confirms that the original copy was correctly copied, and deletes the original from the first device. At step 412, the application creates an original copy of the receipt upon the second device. At step 414, the application creates a watermarked copy of the original receipt upon the first device. At step 416, the application purges the stored copy of the original receipt. At step 418, the process ends. Process 400 is provided as an example to operate procedures and operations disclosed herein, however, a number of exemplary processes are envisioned, and the disclosure is not intended to be limited to the particular examples provided herein.

The flowchart and block diagrams in the flow diagrams illustrate the architecture, functionality, and operation of possible implementations of systems, processes, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing device to function in a particular manner, such that the instructions stored in the computer-readable medium produce an article of manufacture including instruction means which implement the function/act specified in the flowchart and/or block diagram block or blocks.

FIG. 6 schematically illustrates an exemplary tablet computer presenting a plurality of options to a user related to communication processes disclosed herein, according to some embodiments of the disclosure. Configuration 600 includes a portable computerized device embodied as tablet computer 610. Tablet computer 610 includes display 612 displaying a plurality of graphically displayed buttons for selection by a user. Button 620 permits the user to command the device to connect now to a primary portable computerized device that is within range. If multiple potential devices are available for connection, button 630 permits the user to scan for other devices available for connection and allow the user to select which device with which to establish a connection. Button 640 permits the user to command the device to terminate any current wireless connections to other devices. Activation of button 640 can be used to disable the communication device. In another embodiment, the communication device can remain active despite activation of button 640. Button 650 permits the user to enter a device settings mode, for example, permitting the user to enter preferences regarding when the device actively monitors for other potential connections.

Modules and programming are disclosed herein in relation to exemplary device 10. These modules and the associated programming are provided as an example of how the processes may be operated on the disclosed hardware. These examples are provided as non-limiting examples, and the modules and programming can be divided between the hardware in different arrangements without affecting operation of the processes disclosed herein.

The above description of illustrated examples of the present disclosure, including what is described in the Abstract, are not intended to be exhaustive or to be limitation to the precise forms disclosed. While specific embodiments of, and examples for, the disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented process to create a watermarked copy of a unique original copy of an electronic sales receipt, the computer-implemented process comprising:
   providing a unique original copy of the electronic sales receipt in a first mobile computerized device, wherein the first mobile computerized device is registered to a customer account of a customer to whom the electronic sales receipt was provided;
   detecting a second mobile computerized device within a wireless communication range of the first mobile computerized device, wherein the second mobile computerized device is registered to the customer account;
   receiving a request, through a user interface of the first mobile computerized device, to copy the unique original copy of the electronic sales receipt;
   creating a watermarked copy of the electronic sales receipt in response to the request received, comprising:
      copying information from the unique original copy of the electronic sales receipt to the watermarked copy; and
      providing an electronic watermark within the watermarked copy; and
   transmitting the watermarked copy of the electronic sales receipt to the second mobile computerized device.

2. The computer-implemented process of claim 1, wherein providing the electronic watermark comprises including affirmative code within the watermarked copy identifying the watermarked copy.

3. The computer-implemented process of claim 1, wherein providing the electronic watermark comprises omitting from the watermarked copy code within the unique original copy that identifies the unique original copy.

4. The computer-implemented process of claim 1, wherein copying the information comprises directly connecting the first mobile computerized device with the second mobile computerized device.

5. The computer-implemented process of claim 1, wherein copying the information comprises communicating data from the first mobile computerized device to the second mobile computerized device through a communications network.

6. The computer-implemented process of claim 5, wherein communicating the data through the communications network comprises communicating the data through a wireless network.

7. The computer-implemented process of claim 1, further comprising:
   creating the unique original copy of the electronic sales receipt from a paper ticket copy of the electronic sales receipt, comprising:
      capturing an image of the paper ticket copy;
      creating the unique original copy of the electronic sales receipt based upon the image; and
      classifying the paper ticket copy as a printed copy of the unique original copy.

8. The computer-implemented process of claim 7, wherein capturing the image of the paper ticket copy comprises capturing an image of a barcode upon the paper ticket copy.

9. The computer-implemented process of claim 7, wherein creating the unique original copy comprises:
   accessing a remote server including saved data regarding the paper ticket copy;
   retrieving information regarding the paper ticket copy from the remote server; and
   creating the unique original copy based upon the information retrieved.

10. The computer-implemented process of claim 7, wherein classifying the paper ticket copy as the printed copy comprises changing a status of the paper ticket copy on a remote server.

11. The computer-implemented process of claim 7, wherein classifying the paper ticket copy as the printed copy comprises:
   capturing a second image of the paper ticket copy; and
   identifying within the second image a mark indicated to be a barcode of the paper ticket copy; and
   wherein creating the unique original copy of the electronic sales receipt from the paper ticket copy is based upon the identifying the mark.

12. The computer-implemented process of claim 1, further comprising:

displaying upon the first mobile computerized device a barcode associated with the unique original copy; and displaying upon the first mobile computerized device a message identifying the barcode as being associated with the unique original copy.

13. The computer-implemented process of claim 12, further comprising:

assigning a unique barcode to the watermarked copy;

displaying upon the second mobile computerized device the unique barcode assigned to the watermarked copy; and displaying upon the second mobile computerized device a message identifying the unique barcode as being associated with the watermarked copy.

14. A system providing an electronic watermark to a copy of an original electronic sales receipt, the system comprising:

a first computerized device comprising a user interface, the first computerized device configured to:

store a unique original copy of an electronic sales receipt;

receive a request, through the user interface, to copy the unique original copy of the electronic sales receipt;

create a watermarked copy of the original electronic sales receipt by:

copying information from the unique original copy of the electronic sales receipt to the watermarked copy in response to the request received; and providing an electronic watermark within the watermarked copy; and transmit the watermarked copy of the electronic sales receipt to a second computerized device; and a remote server comprising:

an electronic receipt registry module including programming to:

receive data from the first computerized device operated by a customer indicating that the watermarked copy of the original electronic sales receipt is being created; and require that the electronic watermark be included within the watermarked copy.

15. A software application stored on a non-transitory computer-readable medium for creating a watermarked copy of an original electronic sales receipt, the software application comprising:

programming to:

provide a unique original copy of the original electronic sales receipt in a first mobile computerized device, wherein the first mobile computerized device is registered to a customer account of a customer to whom the original electronic sales receipt was provided;

detect a second mobile computerized device within a wireless communication range of the first mobile computerized device, wherein the second mobile computerized device is registered to the customer account;

receive a request, through a user interface of the first mobile computerized device, to copy the unique original copy of the original electronic sales receipt;

create a watermarked copy of the original electronic sales receipt, comprising:

copying information from the unique original copy of the electronic sales receipt to the watermarked copy in response to the request received; and providing an electronic watermark within the watermarked copy; and transmit the watermarked copy of the original electronic sales receipt to the second mobile computerized device.

16. A system providing a watermarked copy of a unique original copy of an electronic sales receipt, the system comprising:

a first mobile computerized device comprising a user interface, wherein the first mobile computerized device is registered to a customer account of a customer to whom the electronic sales receipt has been provided; and a second mobile computerized device, wherein the second mobile computerized device is registered to the customer account, wherein the first mobile computerized device is configured to:

provide the unique original copy of the electronic sales receipt;

detect the second mobile computerized device within a wireless communication range of the first mobile computerized device;

receive a request, through the user interface, to copy the unique original copy of the electronic sales receipt;

create the watermarked copy of the electronic sales receipt in response to the request received, comprising:

copying information from the unique original copy of the electronic sales receipt to the watermarked copy; and providing an electronic watermark within the watermarked copy; and transmit the watermarked copy of the electronic sales receipt to the second mobile computerized device.

17. A method for providing an electronic watermark to a watermarked copy of an original electronic sales receipt, the method comprising:

storing a unique original copy of the electronic sales receipt in a first computerized device;

receiving a request, through a user interface of the first computerized device, to copy the unique original copy of the electronic sales receipt;

creating the watermarked copy of the original electronic sales receipt by:

copying information from the unique original copy of the electronic sales receipt to the watermarked copy in response to the request received; and providing the electronic watermark within the watermarked copy;

transmitting the unique original copy of the electronic sales receipt to a second computerized device;

receiving, by an electronic receipt registry module of a remote server, data from the first computerized device operated by a customer indicating that the watermarked copy of the original electronic sales receipt is being created; and requiring, by the electronic receipt registry module of the remote server, that the electronic watermark be included within the watermarked copy.

18. A software application stored on a non-transitory computer-readable medium for providing an electronic watermark to a watermarked copy of an original electronic sales receipt, the software application comprising programming to:

store a unique original copy of the original electronic sales receipt in a first computerized device;

receive a request, through a user interface of the first computerized device, to copy the unique original copy of the original electronic sales receipt;

create the watermarked copy of the original electronic sales receipt by:
- copying information from the unique original copy of the original electronic sales receipt to the watermarked copy in response to the request received; and
- providing the electronic watermark within the watermarked copy;

transmit the unique original copy of the original electronic sales receipt to a second computerized device;

receive, by an electronic receipt registry module of a remote server, data from the first computerized device operated by a customer indicating that the watermarked copy of the original electronic sales receipt is being created; and require, by the electronic receipt registry module of the remote server, that the electronic watermark be included within the watermarked copy.

* * * * *